US008027881B2

(12) United States Patent
Granich

(10) Patent No.: US 8,027,881 B2
(45) Date of Patent: Sep. 27, 2011

(54) CUSTOM MESSAGING GIFT CARD SYSTEM

(76) Inventor: William J. Granich, Van Nuys, CA (US)

( * ) Notice: Subject to any disclaimer, the term of this patent is extended or adjusted under 35 U.S.C. 154(b) by 0 days.

(21) Appl. No.: 12/646,928

(22) Filed: Dec. 23, 2009

(65) Prior Publication Data

US 2011/0153462 A1    Jun. 23, 2011

(51) Int. Cl.
*G06Q 30/00* (2006.01)
(52) U.S. Cl. ......................... 705/26.1; 705/41
(58) Field of Classification Search ............... 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| | | | | |
|---|---|---|---|---|
| 7,383,213 | B1 * | 6/2008 | Walter | 705/35 |
| 7,711,620 | B2 * | 5/2010 | Abifaker | 705/35 |
| 2010/0004935 | A1 * | 1/2010 | Wain | 704/272 |
| 2011/0034229 | A1 * | 2/2011 | Guziel et al. | 463/17 |

OTHER PUBLICATIONS

No Author, "Visible Results launches Gift Card.", National Petroleum News, 94, 1, 34(1), Jan. 2002. Retrieved from Dialog File:148, Acc#: 14262290.*

* cited by examiner

*Primary Examiner* — Naeem Haq
(74) *Attorney, Agent, or Firm* — Ed De Frank

(57) ABSTRACT

The present invention includes a gift card custom messaging system for creating gift card accounts on a database that includes custom messages created by the purchaser for display on receipts of purchase transactions made by the gift card recipient to convey custom messaging information that can include a greeting, celebratory phrase or a commercial message that can include company logos and electronically sounds and animations and also includes the monetary balance remaining on the gift card to allow the recipient to more easily track the balance. The present invention further includes a variety of gift card formats and receipt display methods that allow various methods of delivery to and use by the recipient.

10 Claims, 6 Drawing Sheets

CUSTOM MESSAGING GIFT CARD SYSTEM

BACKGROUND

Gift cards currently are plastic cards with preprinted messages and a magnetic stripe. The gift card uses the magnetic stripe as a digital storage media. Information recorded on the magnetic stripe includes a card identification, payor electronic access information and an authorization code recorded when purchased and activated using a card reading device. The payor electronic access information is read from the magnetic stripe by a card reading device when a purchase is made using the gift card for payment. The purchase receipt is printed including the card identification to show the payment source. The preprinted messages may include instructions for monetary balance inquiry by telephone or website access.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

GENERAL OVERVIEW

It should be noted that the descriptions that follow, for example, in terms of a custom gift card message is described for illustrative purposes and the underlying process can apply to any number and multiple types of messages in a custom messaging process. In one embodiment of the present invention, the message may be a text communication. The custom messaging process is variable and the message can be combinations of multiple text, symbols, icons, logos or other forms of communication to convey a message to the gift card recipient using the present invention.

Figure 1:
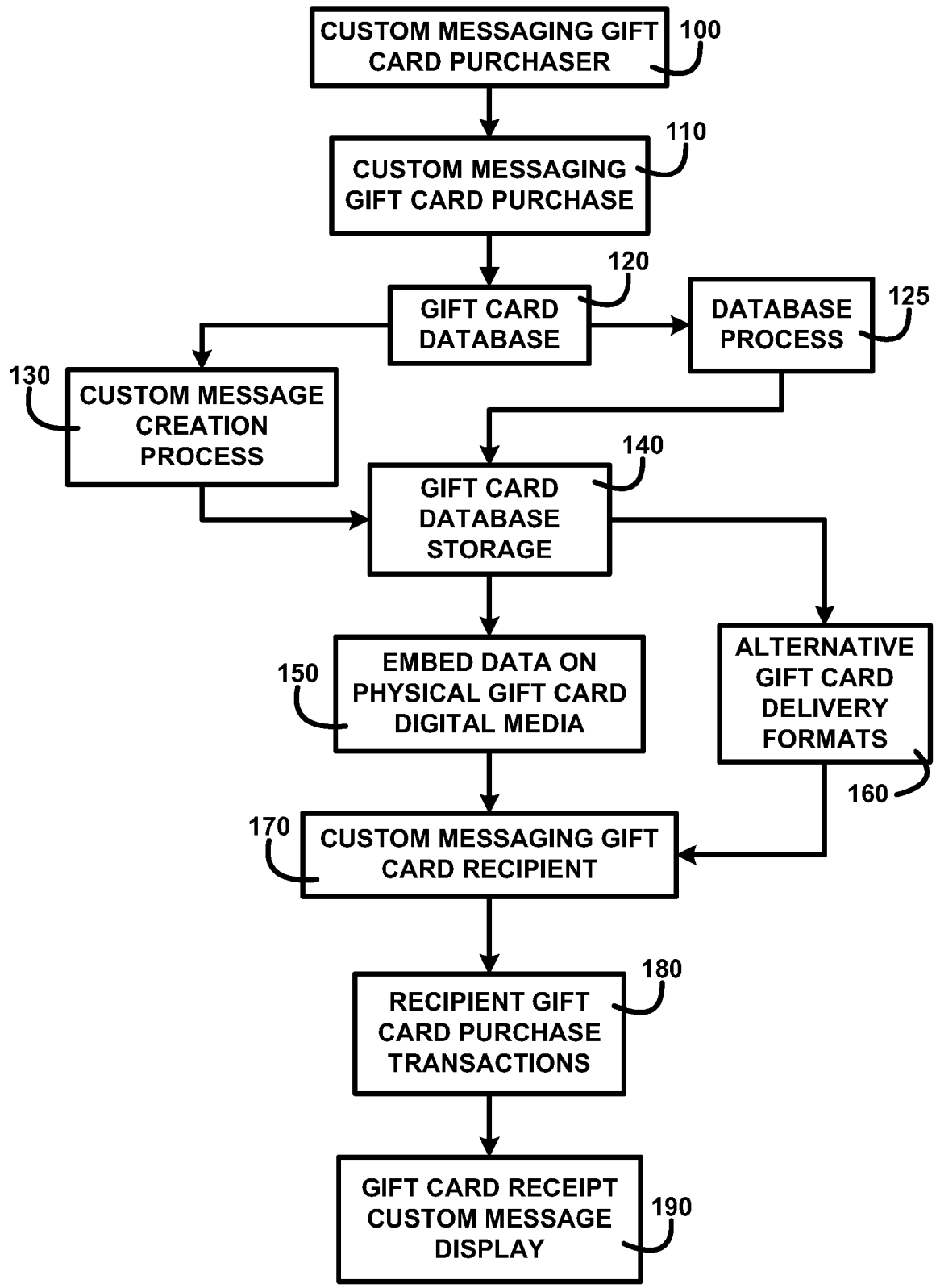
FIG. 1 shows a block diagram of an overview of a custom messaging gift card system of one embodiment of the present invention.

FIG. 1 shows a block diagram of an overview of a custom messaging gift card system of one embodiment of the present invention. FIG. 1 shows a custom messaging gift card purchaser 100 who can access a gift card database 120 to make a custom messaging gift card purchase 110. The gift card database 120 performs a database process 125 to identify each purchased custom messaging gift card and assigns an identification code. The custom messaging gift card purchaser 100 proceeds to a custom message creation process 130 to create gift card custom message information. The gift card custom message information is saved to gift card database storage 140 of one embodiment of the present invention.

The database process 125 continues to create the physical gift cards by downloading the gift card custom message information from the gift card database 120 and embed data on physical gift card digital media 150. The gift card digital storage media can for example be a magnetic stripe or a digital chip. The custom messaging gift card purchaser 100 can then deliver the gift card to a custom messaging gift card recipient 170. The custom messaging gift card recipient 170 can use the gift card to make recipient gift card purchase transactions 180. The transaction process includes downloading a gift card receipt custom message display 190 that is printed or displayed electronically on the transaction receipt. The gift card receipt custom message display 190 includes the gift card custom message information and the balance remaining on the gift card of one embodiment of the present invention.

In another embodiment of the present invention the system provides alternative gift card delivery formats 160. A gift card can be delivered electronically for example by an email with the gift card database identification code and a bar code. The custom messaging gift card recipient 170 can receive a physical gift card from a merchant by scanning the bar code. The bar code scan will access the gift card database 120 and show the prepaid status and when activating the gift card the database process 125 will embed data on physical gift card digital media 150. In another embodiment an electronically delivered gift card can for example include the payment method information allowing the gift card recipient to make purchases on-line. An on-line purchase receipt can display the custom messaging information both in a receipt to be printed and on the display monitor of one embodiment of the present invention.

The present invention allows the custom messaging gift card recipient 170 to easily track the monetary balance remaining on the gift card from the receipt. The custom messaging gift card recipient 170 can write the balance on the balance note boxes provided on the physical custom messaging gift card or electronically delivered gift card. The custom message is displayed on the receipt at the time of purchase using the gift card. The custom message information can include multiple messages. Multiple recipient gift card purchase transactions 180 can provide on the gift card receipt custom message display 190 different custom messages that can sequentially cycle through multiple purchase transactions. The display of one or more custom messages being delivered each time the gift card is used adds to the desired impact of the initial gift card presentation to the message on the custom messaging gift card recipient 170. The use of the custom messaging gift card can strengthen relationships with friends and family and act to increase brand loyalty when used as promotional gifts of one embodiment of the present invention.

Detailed Operation:

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

Figure 2:
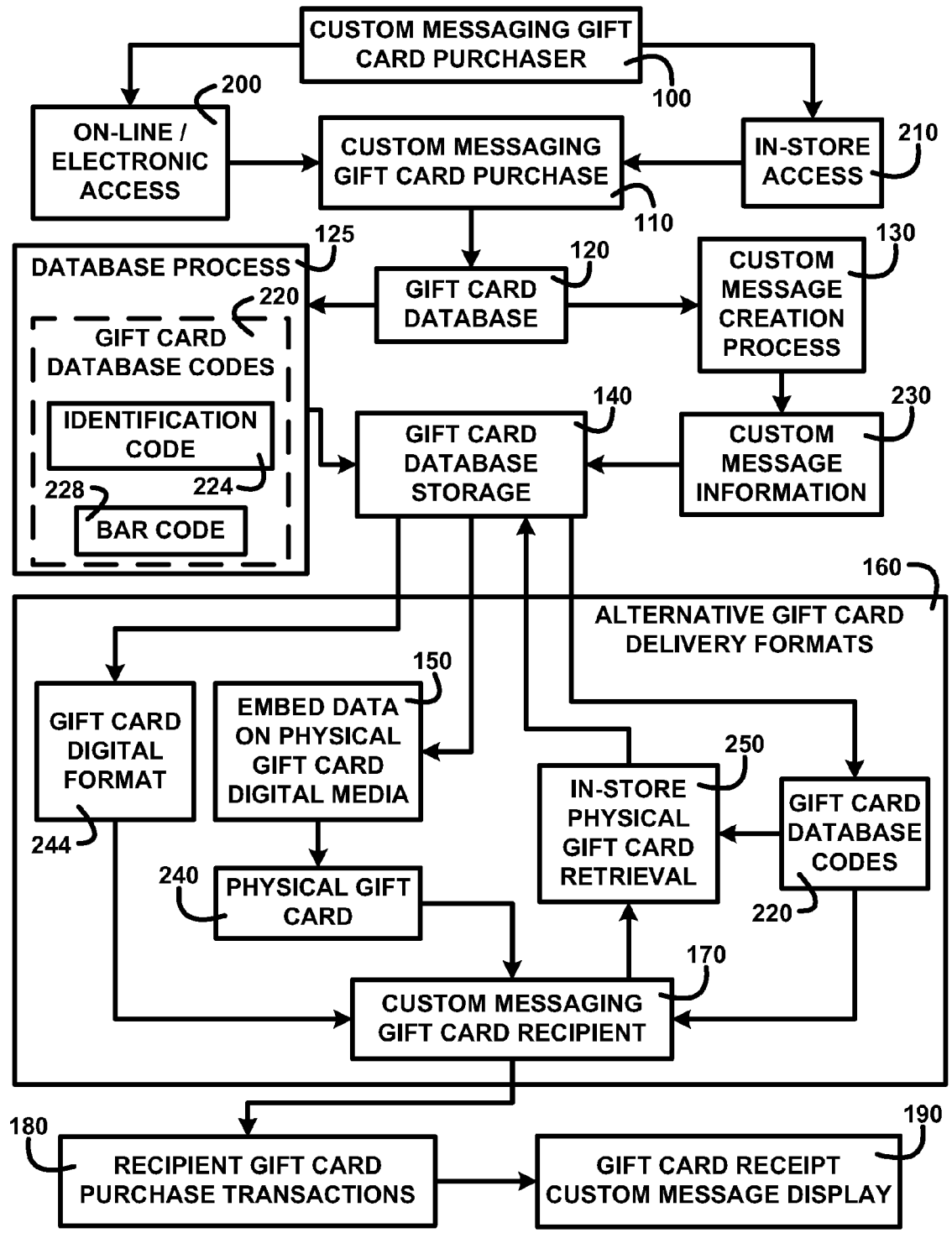
FIG. 2 shows a flow chart of a custom messaging gift card system process of one embodiment of the present invention.

FIG. 2 shows a flow chart of a custom messaging gift card system process of one embodiment of the present invention. FIG. 2 shows the custom messaging gift card purchaser 100 can make a custom messaging gift card purchase 110 using an on-line/electronic access 200 or in-store access 210 to the gift card database 120. The purchase will trigger the gift card database 120 to begin the database process 125. The database process 125 will create gift card database codes 220 that include an identification code 224 and a bar code 228. The custom messaging gift card purchaser 100 can use the custom message creation process 130 to create custom message information 230 that will be saved on the gift card database storage 140 under the gift card database codes 220 for later retrieval of one embodiment of the present invention.

The custom message information 230 and monetary value form a gift card account which represents the gift that is given to the custom messaging gift card recipient 170. Each time the custom messaging gift card recipient 170 makes purchases using the gift card account or the gift card the recipient can then receive the message of what ever information the custom messaging gift card purchaser 100 desires. The message can be received at whatever location and by means that can include for example a tape receipt, email receipt or notice, text message or displayed on a computer screen of one embodiment of the present invention.

Alternative Gift Card Delivery Formats:

FIG. 2 shows the alternative gift card delivery formats 160 available through the present invention. The alternative gift card delivery formats 160 provide the custom messaging gift card purchaser 100 with alternative methods of delivery of the gift card account to the custom messaging gift card recipient 170. The custom messaging gift card purchaser 100 can make the custom messaging gift card purchase 110 and custom message creation process 130 at a store to embed data on physical gift card digital media 150 and purchaser receive a physical gift card 240. The custom messaging gift card purchaser 100 can then in person deliver for example the physical gift card 240 in a birthday card to the custom messaging gift card recipient 170 of one embodiment of the present invention.

The custom messaging gift card purchaser 100 can make the custom messaging gift card purchase 110 and custom message creation process 130 on-line and print out the gift card database codes 220 and go to a store and use in-store physical gift card retrieval 250 that can access the gift card database storage 140 to embed data on physical gift card digital media 150 and receive the physical gift card 240. Alternatively the custom messaging gift card purchaser 100 can send the gift card database codes 220 to the custom messaging gift card recipient 170 to make use of in-store physical gift card retrieval 250. The gift card database codes 220 can be sent for example by hard copy or an on-line delivery via email, text message or any other electronic device of one embodiment of the present invention.

The custom messaging gift card purchaser 100 can for example through an on-line purchase place an order to embed data on physical gift card digital media 150 the custom message information 230 on one or more physical gift card 240 that can be shipped. One or more physical gift card 240 can be shipped to the custom messaging gift card purchaser 100 or directly to the custom messaging gift card recipient 170 of one embodiment of the present invention.

The custom messaging gift card purchaser 100 can send a gift card digital format 230 to the custom messaging gift card recipient 170 to use in making on-line purchases. The gift card digital format 230 can be sent for example by on-line delivery via email, text message or any other electronic device of one embodiment of the present invention.

The recipient gift card purchase transactions 180 using any of the alternative gift card delivery formats 160 will allow the gift card receipt custom message display 190 to be presented to the recipient. The alternative gift card delivery formats 160 can be of benefit to the custom messaging gift card recipient 170 who may for example have difficulty traveling to a store to make purchases or is in a location where mail delivery is difficult but they have access to make on-line purchases of one embodiment of the present invention.

In another embodiment of the present invention the custom messaging gift card purchaser 100 can register for a customer number and then buy the gift card online and upload logos and messages. This allows the custom messaging gift card purchaser 100 to pick up the physical gift card 240 at a retail store by showing ID and giving a cashier the registered customer number. The cashier can enter the registered customer number into a point of sale register which will access the gift card database 120 and embed data on physical gift card digital media 150 to complete the in-store physical gift card retrieval 250 of one embodiment of the present invention.

Figure 3:
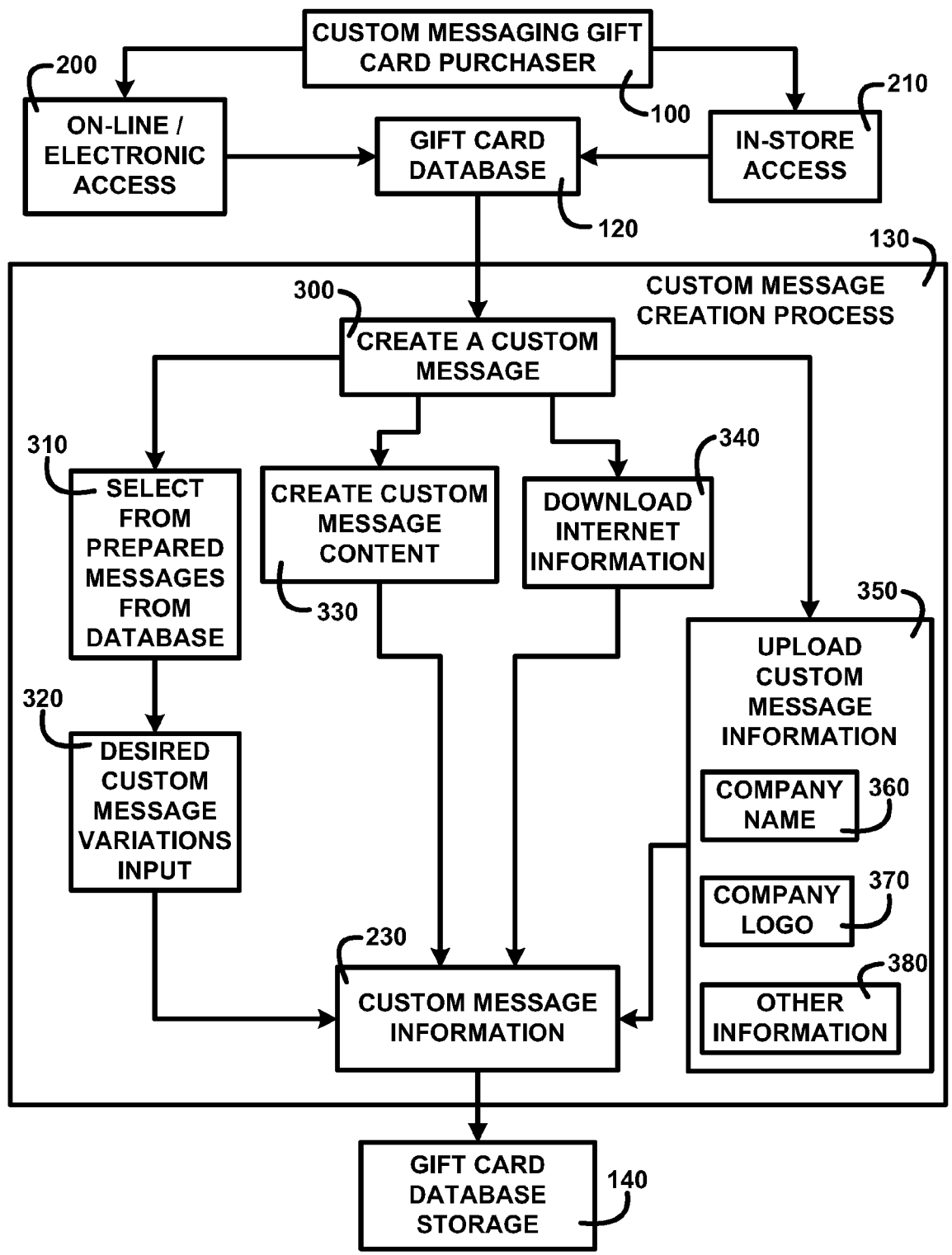
FIG. 3 shows a flow chart of a custom messaging gift card custom message creation process of one embodiment of the present invention.

Custom Message Creation Process:

FIG. 3 shows a flow chart of a custom messaging gift card custom message creation process of one embodiment of the present invention. The custom messaging gift card purchaser 100 can create custom messages using either on-line/electronic access 200 or in-store access 210 of the gift card database 120. The custom message creation process 130 can create a custom message 300 using one or more method. The custom messaging gift card purchaser 100 can select from prepared messages from database 310 and edit the prepared messages with desired custom message variations input 320 of one embodiment of the present invention.

The custom messaging gift card purchaser 100 can create custom message content 330 to input entirely new message content. The custom message creation process 130 allows the purchaser to download internet information 340. A purchaser can also upload custom message information 350 including a company name 360, a company logo 370 or other information 380. The purchaser can then save the custom message information 230 on gift card database storage 140 of one embodiment of the present invention.

The custom message information 230 could for example be a personal greeting such as "HAPPY BIRTHDAY Tony, from Aunt Mabel" or messaging for sales people that could be "COMPLIMENTS of Company Name (and/or logo) Thank you for your support of our product (name and/or logo)". The present invention provides a database that allows for elaborate message customization and storage of the created custom messaging for later display to the custom messaging gift card recipient 170 of FIG. 1 of one embodiment of the present invention.

The custom message information 230 can be collected either at a point of sale register in a store or online via a website. Custom message information 230 to be input on each Gift Card for example can be uploaded via various means such as email, online, at point of purchase, over the phone, text messaging or on demand television of one embodiment of the present invention.

Figure 4:
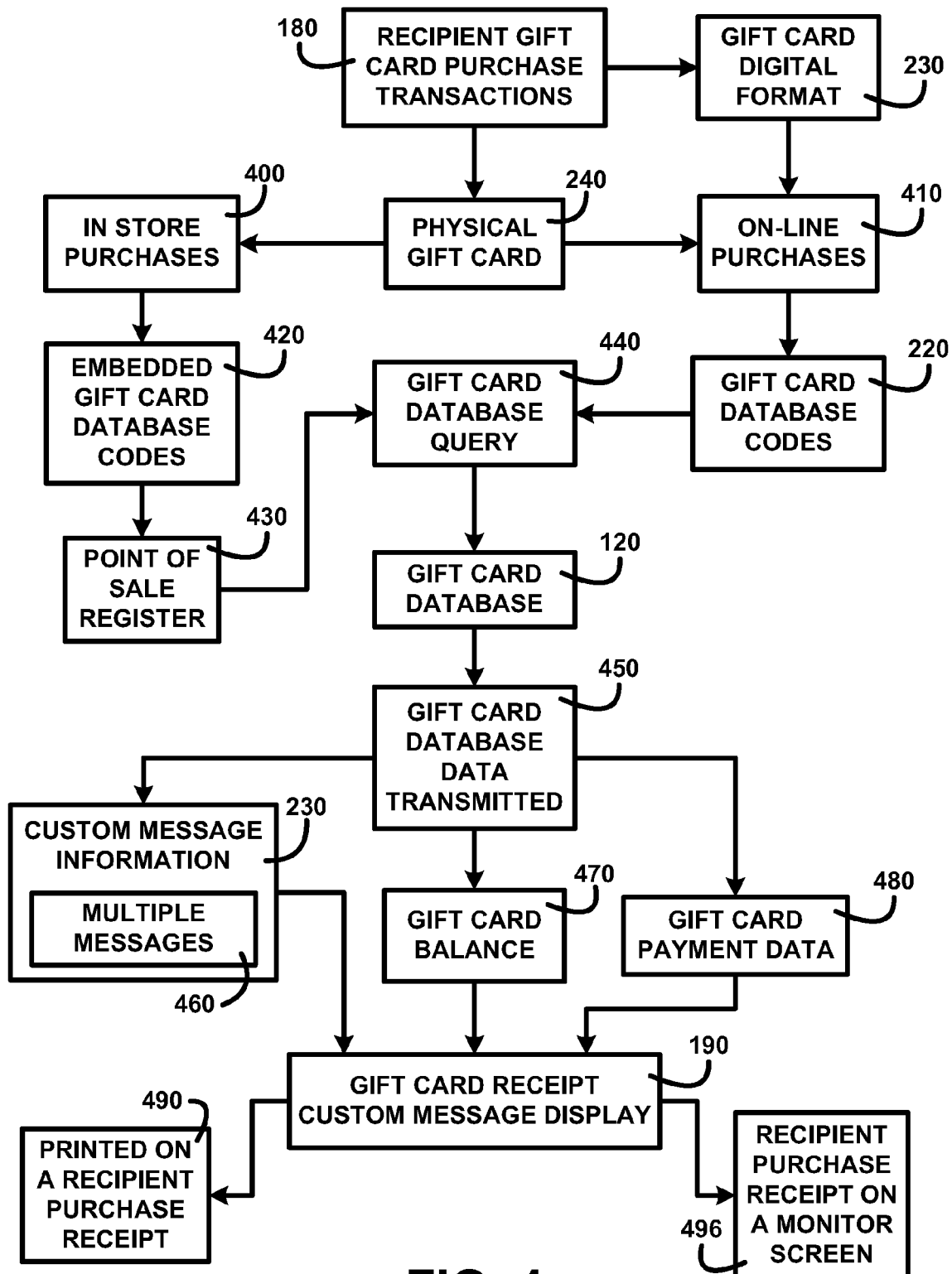
FIG. 4 shows a flow chart of a custom messaging gift card message display process of one embodiment of the present invention.

Gift Card Message Display Process:

FIG. 4 shows a flow chart of a custom messaging gift card message display process of one embodiment of the present invention. FIG. 4 shows the various methods in which the gift card custom message information 230 can be displayed. The custom message information 230 is retrieved from the gift card database 120 for display on receipts of the recipient gift card purchase transactions 180. The gift card database 120 can be accessed using the physical gift card 240 for in store purchases 400 when embedded gift card database codes 420 are input into a point of sale register 430 by a card reader. The point of sale register 430 makes a gift card database query 440 using the embedded gift card database codes 420 unique to the physical gift card 240 of one embodiment of the present invention.

In another embodiment the gift card digital format 230 or the physical gift card 240 can be used for on-line purchases 410. Entering the gift card database codes 220 using for example a computer connected through the internet can be used to make a gift card database query 440. The custom message information 230 can be accessed directly from a physical gift card 240 using as digital storage media a digital chip that has been embedded with the information of one embodiment of the present invention.

The gift card database 120 completes the recipient gift card purchase transactions 180 query with gift card database data transmitted 450 to the point of sale register 430 or an on-line vendor system. The gift card database data transmitted 450 can include the gift card payment data 480, the gift card balance 470 and the custom message information 230. The custom message information 230 may include multiple messages 460 which for example can be different messages that rotate display after each of the recipient gift card purchase transactions 180 of one embodiment of the present invention. Hence, multiple messages can be programmed for a gift card. Also, messages could rotate or can be printed in order each time the card is used or be triggered in sequential order as the card is used and the balance gets depleted.

The custom message information 230 is shown on the gift card receipt custom message display 190 together with the gift card payment data 480 and the gift card balance 470. The gift card receipt custom message display 190 can be printed on a recipient purchase receipt 490. The custom message will be printed on the receipt where the total amount of purchase and the card balance is printed. Many point of sale register 430 receipts are thermal printed and can be capable of printing a custom message that includes for example logos. The custom messaging gift card purchase, message creation and preparation of a physical gift card 240 access operations can be computer codes downloaded as an application or add-on to existing point of sale register 430 systems including the network the registers are connected to for store operations. The receipt can also be printed for on-line purchases. The gift card receipt custom message display 190 for on-line purchases can be more elaborate since there can be fewer limitations with the size of the message and the printer of one embodiment of the present invention.

The custom message information 240 and gift card balance 470 can be shown by a recipient purchase receipt on a monitor screen 496. The gift card receipt custom message display 190 for example for on-line purchases can incorporate the use of computer screens, television screens, cell phones or PDA offer the custom messaging gift card recipient 170 of FIG. 1 larger viewing capacities as well as color and sound options. These devices can have features that allow display of custom message information 230 of a greater size or amount of message, colors, shapes, sounds, lights, animations, or generation of effects. The custom message information 230 can be created and displayed uniquely to every person that is given to adding value to the gift of one embodiment of the present invention.

Physical Custom Messaging Gift Card:

The custom messaging gift card can be configured as a set of unique codes can be used to make purchases electronically for example on-line through the internet. The set of unique codes can be delivered for example via email, hard mail or note, text messages, or supplied at any website URL as an added feature. The custom messaging gift cards can be for example configured in the form of hard plastic cards in any size, shape or form of one embodiment of the present invention.

Figure 5A:
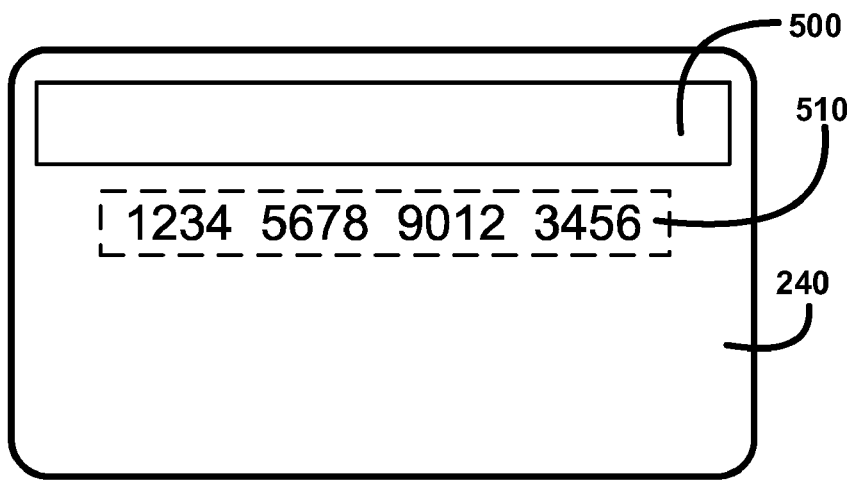
FIG. 5A shows for illustrative purposes only shows an example of a custom messaging gift card with a magnetic stripe front view of one embodiment of the present invention.
Figure 5B:
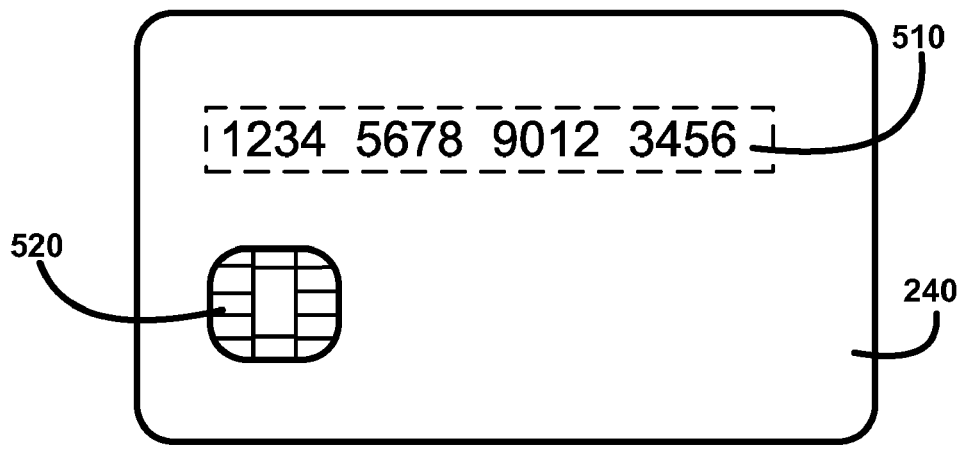
FIG. 5B shows for illustrative purposes only shows an example of a custom messaging gift card with a digital chip front view of one embodiment of the present invention.

The custom messaging physical gift card 240 of FIG. 2 can for example be in the form of typical credit/debit card sized plastic. In another embodiment the custom messaging physical gift card 240 of FIG. 2 can for example be configured in a smaller size such as key chain sized plastic card. The size, shape and form of the custom messaging physical gift card 240 of FIG. 2 can vary for example to provide convenience of use to the gift card recipient. The custom messaging physical gift card 240 of FIG. 2 configured in all sizes, shapes and forms will include a digital storage media to allow embedding of information such as gift card database codes 220 of FIG. 2 in the digital storage media. FIG. 5A and FIG. 5B illustrate examples of digital storage media that can be included in a hard plastic custom messaging physical gift card 240 of FIG. 2 of one embodiment of the present invention.

Magnetic Strip:

FIG. 5A shows for illustrative purposes only shows an example of a custom messaging gift card with a magnetic stripe front view of one embodiment of the present invention. FIG. 5A shows a front view of a custom messaging physical gift card 240 as a hard plastic card with a magnetic strip 500 for use as a digital storage media. Card readers at stores can be used to access the gift card database codes 220 of FIG. 2 embedded on the custom messaging physical gift card 240. Each hard plastic custom messaging gift card 380 can have a messaging gift card identification number 510 of one embodiment of the present invention.

Digital Chip:

FIG. 5B shows for illustrative purposes only shows an example of a custom messaging gift card with a digital chip front view of one embodiment of the present invention. FIG. 5B shows a front view of a custom messaging physical gift card 240 as a hard plastic card with a digital chip 520 for use as a digital storage media. The use of the digital chip 520 will allow access to the gift card database codes 220 of FIG. 2 embedded on the custom messaging physical gift card 240 by electronic smart card transfer or card reading devices. The data stored on the digital chip 520 can for example include the custom messaging information and the card monetary balances. Each hard plastic custom messaging physical gift card 240 can have a messaging gift card identification number 510 of one embodiment of the present invention.

Figure 6:
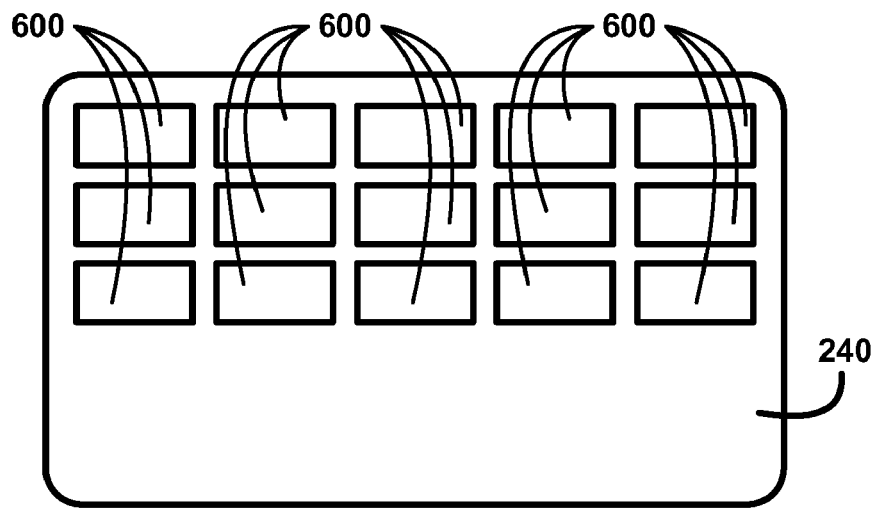
FIG. 6 shows for illustrative purposes only shows an example of a custom messaging gift card balance record note squares back view of one embodiment of the present invention.

User Balance Note Boxes:

FIG. 6 shows for illustrative purposes only shows an example of a custom messaging gift card balance record note squares back view of one embodiment of the present invention. FIG. 6 shows a view of the back of the custom messaging physical gift card 240. User balance note boxes 600 are incorporated onto the back of the custom messaging physical gift card 240. The user balance note boxes 600 can for example be varied numbers and sizes of painted or plastic boxes within which the custom messaging gift card recipient 170 of FIG. 1 can write the remaining balance of the card after each use of one embodiment of the present invention.

Figure 7:
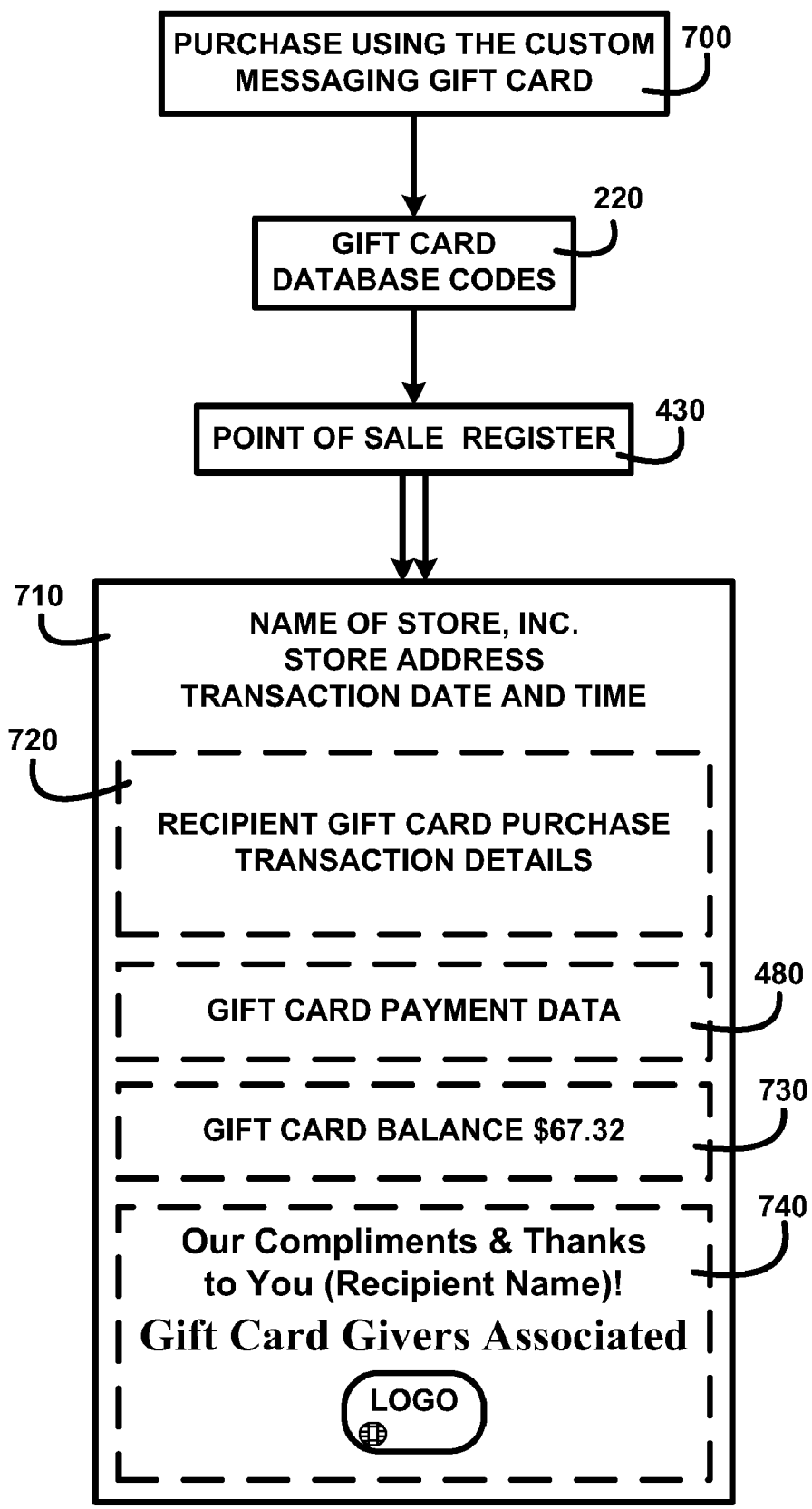
FIG. 7 shows for illustrative purposes only shows an example of a custom messaging gift card printed purchase receipt of one embodiment of the present invention.

Printed Purchase Receipt Example:

FIG. 7 shows for illustrative purposes only shows an example of a custom messaging gift card printed purchase receipt of one embodiment of the present invention. FIG. 7 shows a purchase using the custom messaging gift card 700 in a store made by the custom messaging gift card recipient 170 of FIG. 1. The custom messaging gift card recipient 170 of FIG. 1 gives to the register attendant the gift card database codes 220 to enter into the point of sale register 430 of one embodiment of the present invention.

The point of sale register 430 produces a printed custom messaging gift card recipient purchase receipt 710 showing the recipient gift card purchase transaction details 720. Included on the printed receipt is the gift card payment data 480. The printed receipt also shows the gift card receipt custom message display 190 of FIG. 1 of one embodiment of the present invention.

The gift card receipt custom message display 190 of FIG. 1 shown in FIG. 7 shows examples of the custom message information 230 of FIG. 2. The custom messaging gift card recipient 170 of FIG. 1 can clearly see for example a gift card balance $67.32 730 which they can record in one of the user balance note boxes 600 of FIG. 6. The desired custom message information 230 from the custom messaging gift card purchaser 100 of FIG. 1 is displayed on the example printed receipt to convey the intended message information 740 to the custom messaging gift card recipient 170 of FIG. 1. In the example shown in FIG. 7 the intended message information 740 includes the custom message "Our Compliments & Thanks to You (Recipient Name)!"; the company name 360 "Gift Card Givers Associated" and the company logo 370 of the custom messaging gift card giver. The display of the custom message information 230 of FIG. 2 on each purchase receipt adds impact and identity value to the monetary value of the gift benefiting the custom messaging gift card purchaser 100 of FIG. 1. The repeated display of the custom message on each purchase receipt provides the custom messaging gift card recipient 170 of FIG. 1 a reminder of the gift card balance 470 of FIG. 4 and of the giving sentiment intended by the custom messaging gift card purchaser 100 of FIG. 1 and giver of one embodiment of the present invention.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A gift card custom messaging method, comprising:
using computer code operating on a computer to centrally allow a gift card presenting purchaser to purchase a gift card and create a messaging gift card account that includes a monetary amount purchased by the gift card presenting purchaser;
using computer code operating on the computer to allow custom message information to be created a first remote location by the gift card presenting purchaser;
using computer code operating on the computer to allow a custom messaging gift card recipient to make purchases at a second remote location using the custom messaging gift card account and receive the custom message information from the purchaser and current gift card account balances by visual display; and
printing the visual display on a transaction receipt, wherein the custom message is printed on the transaction receipt after immediate usage of the gift card and wherein the custom message sequentially cycles through numerous other predefined custom messages so that different custom messages are printed on different respective transaction receipts during different retail transaction use of the gift card, wherein the custom gift card is a physical gift card configured to incorporate a digital media for storage and retrieval of custom messaging gift card identification codes, custom message information and a designated box area for allowing written updated gift card balance.

2. The method of claim 1, wherein the gift card includes at least one of transmittal of gift card database codes or a gift card digital format.

3. The method of claim 1, further comprising delivering the custom messaging information to the custom messaging gift card recipient via at least one of email, postal mail, physical note, text message, or through a website URL.

4. The method of claim 1, wherein the computer code operates a database that is coupled to at least one of point of sale registers, internet websites, cell phones, demand television, ipods, pda and other electronic devices.

5. The method of claim 4, wherein the database includes pre-prepared messages stored in the database for allowing the gift card presenting purchaser to create variations in the pre-prepared messages to form a desired custom message.

6. A gift card custom messaging system, comprising:
gift card computer code configured to centrally allow a gift card presenting purchaser to purchase a gift card and create a messaging gift card account that includes a monetary amount purchased by the gift card presenting purchaser;
custom message computer code configured to allow custom message information to be created a first remote location by the gift card presenting purchaser;
remote computer code configured to allow a custom messaging gift card recipient to make purchases at a second remote location using the custom messaging gift card account and receive the custom message information from the purchaser and current gift card account balances by visual display; and
printing the visual display on a transaction receipt, wherein the custom message is printed on the transaction receipt after immediate usage of the gift card and wherein the custom message sequentially cycles through numerous other predefined custom messages so that different custom messages are printed on different respective transaction receipts during different retail transaction use of the gift card, wherein the custom gift card is a physical gift card configured to incorporate a digital media for storage and retrieval of custom messaging gift card identification codes, custom message information and a designated box area for allowing written updated gift card balance.

7. The gift card custom messaging system of claim 6, wherein the gift card includes at least one of transmittal of gift card database codes or a gift card digital format.

8. The gift card custom messaging system of claim 6, further comprising delivery computer code configured to deliver the custom messaging information to the custom messaging gift card recipient via at least one of email, postal mail, physical note, text message, or through a website URL.

9. The gift card custom messaging system of claim 6, further comprising database computer code configured to operate a database that is coupled to at least one of point of sale registers, internet websites, cell phones, demand television, ipods, pda and other electronic devices.

10. The gift card custom messaging system of claim 9, wherein the database includes pre-prepared messages stored in the database for allowing the gift card presenting purchaser to create variations in the pre-prepared messages to form a desired custom message.

* * * * *